United States Patent [19]
Barnes et al.

[11] Patent Number: 5,941,917
[45] Date of Patent: Aug. 24, 1999

[54] WAND-AXLE ZERO SET

[75] Inventors: Ronny L. Barnes, O'Donnell; H. Wayne Mathews, Sherman, both of Tex.

[73] Assignee: Gar-Bar Corporation, O'Donnell, Tex.

[21] Appl. No.: 08/704,118

[22] Filed: Aug. 28, 1996

Related U.S. Application Data

[60] Provisional application No. 60/003,009, Aug. 31, 1995.

[51] Int. Cl.$^6$ .................................................. G05D 1/00
[52] U.S. Cl. ................................. 701/23; 701/41; 701/50
[58] Field of Search .................................. 701/23, 41, 50, 701/116, 205; 180/167, 168, 169, 170, 179, 401; 172/191; 56/10.2 F

[56] References Cited

U.S. PATENT DOCUMENTS

| | | | |
|---|---|---|---|
| 4,835,691 | 5/1989 | Rotem et al. | 364/424.02 |
| 4,999,776 | 3/1991 | Soltis et al. | 364/424.05 |
| 5,019,983 | 5/1991 | Schutten et al. | 364/424.07 |
| 5,170,849 | 12/1992 | Nikkel et al. | 172/6 |
| 5,318,143 | 6/1994 | Parker et al. | 180/168 |
| 5,387,853 | 2/1995 | Ono | 318/587 |
| 5,410,479 | 4/1995 | Coker | 364/424.02 |
| 5,483,453 | 1/1996 | Uemura et al. | 364/424.02 |
| 5,606,504 | 2/1997 | Andersen | 364/424.07 |

*Primary Examiner*—William A. Cuchlinski, Jr.
*Assistant Examiner*—Arthur Donnelly
*Attorney, Agent, or Firm*—Wendell Coffee; Mark E. Scott

[57] ABSTRACT

A farm tractor is automatically guided along a row of stalks to harvest the crop from the stalks. Every 30 ms the average of 10 ms readings of the distance or deviation of the tractor from the row of stalks is calculated. The angles of the guiding wheels are measured. These two are compared. If the wheels are not angled correctly according to this comparison, a correction is made to the steering wheel, which is the manual steering wheel normally used to guide the tractor. For Auto-Track the deviation is averaged for ⅞ths of a second. If this average shows that the tractor is deviating consistently to one side or another the deviation will be corrected according to the controls. The ⅞ths second calculation is repeated every ⅞ths of a second. At any time that the ⅞ths calculation shows that there is a persistent deviation a correction will be made. These corrections will remain as a permanent correction until a subsequent correction changes them. Subsequent corrections may either add to or subtract from the correction. For Smart-Drive every 30 ms a determination is made as to whether the tractor is on the same side of the stalks as it was one second previously. Also, the determination will be made as to whether the tractor is closer to the row of stalks on the same side of the stalks than it was one second earlier. If the tractor is closer to the row of stalks, and on the same side as it was one second earlier, then the guiding wheels are adjusted to bring the tractor back to the row of stalks at a slower correction rate than before.

13 Claims, 3 Drawing Sheets

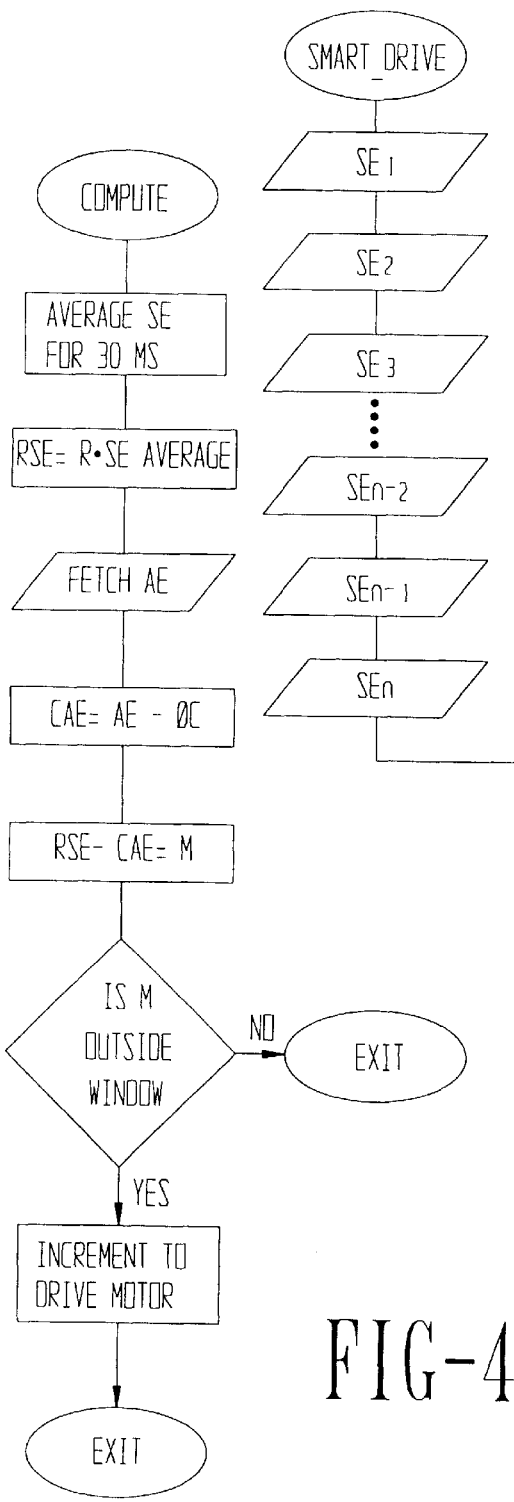
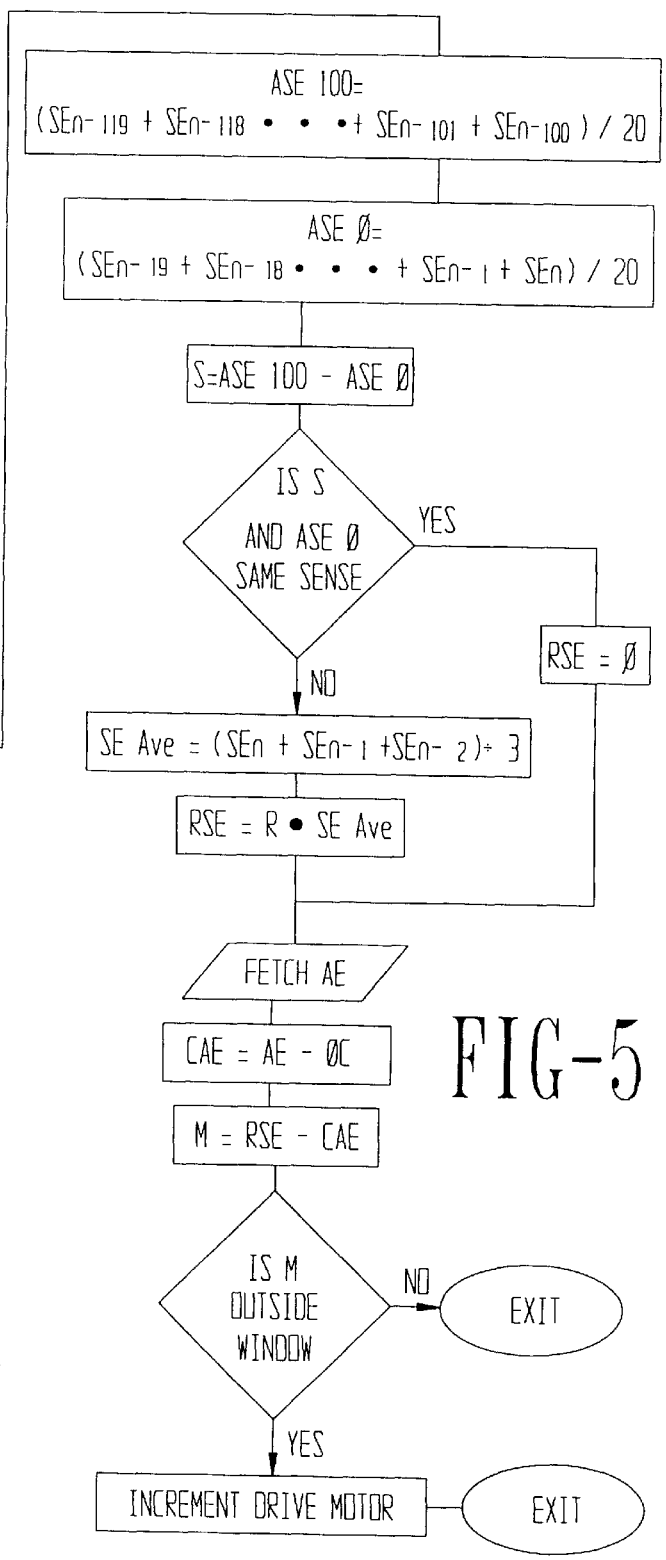
FIG-4
FIG-5

WAND-AXLE ZERO SET

PROVISIONAL PATENT APPLICATION

Applicant filed a Provisional Application on this subject matter on Aug. 31, 1995, Ser. No. 60/003,009. Specific reference is made to that document.

BACKGROUND OF THE INVENTION

(1) Field of the Invention

This invention relates to automatically guiding a vehicle to follow a discernable path. An example is the automatic guiding of an agricultural harvester along a row of plants.

(2) Description of the Related Art

Guidance systems in existence today use sensors. These sensors, produce a signal variable with the relative position of the vehicle to the desired path. As the vehicle moves in relation to the path, a signal is produced comparable to the linear displacement. Equipment such as a specialized digital computer is used to evaluate this signal and produce a correction signal, resulting in controlling guide wheels to turn right or left. As the guide wheel is turned an additional sensor is used to monitor the guide wheel position and cause a resultant signal to cancel the action originally taken.

While this technique proves to perform the vehicle guidance under most circumstance, certain precision factors are ignored. A device controlled by the operator must be adjusted to determine when the guide wheels are in alignment and parallel to the vehicle axis, the point at which the crop sensor indicates proper alignment, and the exact ratio to guide wheel movement the instrument will equalize.

Also known was a guidance system using digital optical sensors capable of determining angular displacements consistently of 0.33 degrees throughout its life. Each sensor has a "zero" azimuth marker. The sensor measures angular displacement from the zero azimuth, with one direction positive and the other negative.

A digital motor with rotational travel resolution of 1.66 degrees has been used to move the steering wheel as needed from calculations of the computer. The system is fully digital from the input of the sensing system to the output which controls the steering device, therefore precise movement is accomplished consistently.

SUMMARY OF THE INVENTION

This invention includes improvements for more precisely following the path. Difficulty is experienced when the path is curved instead of straight or when the vehicle is biased away from the path. Such bias might be the result of wind or sloping terrain. When farm tractors are tilling the soil, different soil characteristics on opposite sides of the tractor will cause bias as will a low inflated tire on a road vehicle. The system or invention for this is referred to as Auto-Track.

Auto-Track has two purposes. The first is to compensate for axle encoder dead-ahead misalignment; either measured only, or measured versus actual. During installation of the guidance system previously it was imperative to set the straight ahead, or dead-ahead, marker or zero azimuth within the axle encoder as close as possible to the position of the guide wheel when the vehicle is traveling in a straight line. This marker is then used as a reference point for steering commands.

It is known that if the guide wheels are turned to a fixed position from straight ahead, the vehicle would travel in a circle. The circumference of travel would be determined by the angular displacement of the guide wheels. Auto-Track senses contours, uneven terrain, and misalignment of the straight ahead marker, and corrects the apparent position of the axle encoder accordingly. Thus the angular displacement is held closer to a constant for negotiating the given conditions. Driving through poor crop stands, varying terrain, and contours is greatly improved.

As the vehicle travels in a straight line, steering input causes the vehicle to deviate left and right evenly around the center lined when the dead-ahead marker is true. As the reference is rotated from the true position, the vehicle wanders, or hovers, to either the left or right side of center depending upon the sign of the marker error. If the crop sensor input is evaluated over time, or averaged, the sign of the error can be detected. This error can then be used to offset the encoder to allow true alignment.

Auto-Track functions by averaging the sensor position over a period of time. The time interval should be large enough to prevent detection of instantaneous changes, but short enough to make necessary steering corrections prior to excessive vehicle to crop deviations. Through experimentation it was found that large angular displacements made too quickly would cause the vehicle to oscillate side to side around center. Too small of a change, or too long between changes, would not accomplish the correction needed to negotiate the obstacle satisfactorily. Since the axle encoder used had a resolution of ⅓ degree, this value became the increment of change and a timer is used to limit the changes over time. The exact time depends upon vehicle speed and the time of steering input to output. Although not critical, good or workable change for speeds of 3 to 6 mph was found to be around 870 ms±130 ms.

Smart-Drive is the term given another system or invention which is an aid in negotiating sudden changes in the path called crooks. When the vehicle drifts off course, or the path changes, the system gives a steering input. Once the direction of error changes it is known the vehicle is traveling back toward center. The steering is then rapidly decreased to only a fraction of the equivalent outbound steering input. This process allows the system to respond ahead of time and reduces the probability of center line overshoot.

The preferred implementation of the inventions summarized above is by a specialized (single purpose) digital computer. Briefly describing the Auto-Track operation, first the signals from an axle encoder (guide wheel encoder and Quadrature Decoders) (AE) is fed to a RAM (random access memory).

Readings from a sensor encoder (wand encoder and Quadrature decoders) SE is fed to the RAM. The readings are taken from the RAM by a microprocessor every 10 ms.

For normal steering operations, every 30 ms period the 30 ms average sensor encoder readings (SE) are compared to the axle encoder readings (AE). If they are not in the desired relationship, (which is a linear relationship) a correction M is fed to the steering wheel motor (motor drive circuit). Corrections are fed every 30 ms until the desired relationship of encoder readings are obtained. Any subsequent imbalance in the relationship of the axle encoder and the sensor encoder readings will result in a correction to the steering wheel motor as described above.

For the Auto-Track, the 10 ms readings from the sensor encoder are totaled and averaged for 870 ms. If this 870 ms average is zero, no correction is made. If this 870 ms average is outside of a window around zero then, a correction is added by the microprocessor to the reading received from the axle encoder to form a "corrected axle encoder" reading.

The "corrected axle encoder" reading will be the axle encoder number plus corrections. (It is understood that the sense of this digit correction may be either positive or negative).

As soon as the digit is added to the axle encoder, a clock is started which prohibits the taking of a reading of the sensor encoder for the Auto-Track purposes for the next 870 ms. At that time another reading will be taken and again if the total reading of the sensor encoder is outside of the window another correction will be added to the corrected axle encoder so that there will be a new corrected axle encoder reading to be used as in the normal comparison for guiding purposes.

The raw data for Auto-Track could be taken from any one of three sources. It could be taken (as explained above) from the sensor encoder SE. It could also be taken from the corrected axle encoder CAE. It could also be taken from the steering motor input (output from the microprocessor) M. Each of these readings will indicate whether there is a bias or persistent correction needed which would be to correct the vehicle on curves or uneven terrain.

OBJECTS OF THIS INVENTION

An object of this invention is to precisely guide a vehicle along a discernible path.

Further objects are to achieve the above with devices that are sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install and operate.

The specific nature of the invention, as well as other objects, uses, and advantages thereof, will clearly appear from the following description and from the accompanying drawings.

BRIEF DESCRIPTION OF THE DRAWINGS

FIG. 4 is a simplified flow chart for the application of the Auto-Track which includes the zero set.

FIG. 5 is a simplified flow chart showing the application of the Smart-Drive and the Auto-Track to result in a complete system.

CATALOGUE OF ELEMENTS

Figure 1:
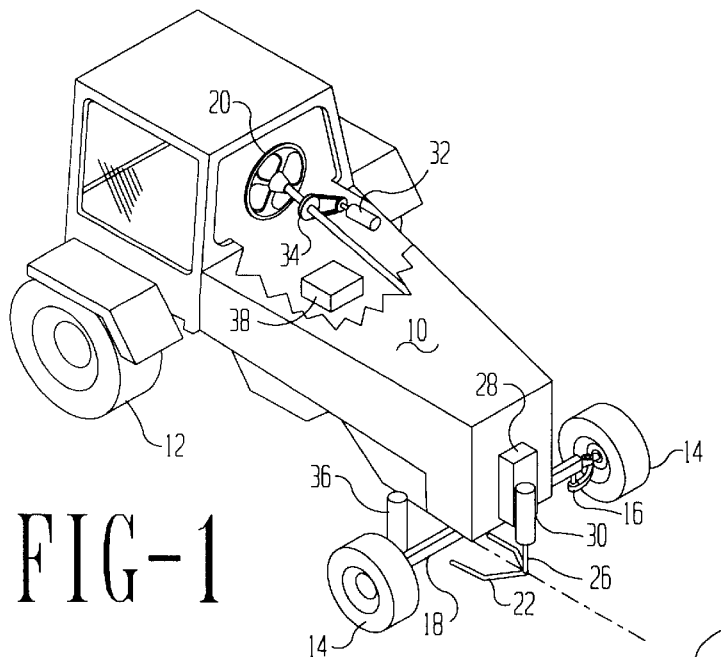
FIG. 1 is a schematic representation of a farm tractor equipped for this invention.

As an aid to correlating the terms to the exemplary wing(s), the following catalog of elements is provided:

10 vehicle
12 drive wheels
14 guide wheels
16 axle, vertical
18 front axle
20 steering wheel
22 sensor, wand
26 shaft, sensor
28 bracket
30 encoder, sensor
32 steering motor
34 suitable mechanism
36 axle encoder
38 computer As an aid to correlating the terms to the simplified flow charts and equations, the following catalog of symbols is provided:

AE—axle encoder 36 digitized reading (the output of the axle quadrature decoder)
OC—zero correction
CAE—the corrected axle encoder digitized reading (AE+ axle offset or zero correction). The CAE itself is axle-sum or corrected axle encoder digitized reading.
SE—deviation or sensor encoder 30 digitized reading (the output of the sensor quadrature decoder)
S—slope (change of SE in one second)
RSE—ratio adjusted sensor encoder digitized reading (SE multiplied by R)
ASE—average SE for slope calculations
DAP—RSE or desired axle position.
R—an adjustable sensitivity constant
M—signal for the steering motor 32.
ms—$1/1000$ of a second

DESCRIPTION OF THE PREFERRED EMBODIMENT

Referring to the drawing, there may be seen somewhat schematically represented a vehicle 10 in the form of a tractor. The tractor will have two drive wheels 12 and two dirigible or steerable or guide wheels 14. As illustrated, each guide wheel is mounted upon a verticle axle 16 which is journalled to a front axle 18. By the rotation of the axle 16 about a vertical axis, the wheels 14 are turned thus guiding or steering the tractor 10. In normal operation, the turning of the axle 16 is controlled by steering wheel 20.

As is well known, at least to the art of guiding of agricultural tractors, the path to be followed will often be a row of crops (not shown). The relationship of the tractor to the path is determined by sensor 22. The sensor 22 is mounted upon vertical, rotatable shaft 26 journalled by suitable bracket 28 to the front of the vehicle 10. As shown, the bracket is attached to the front of the tractor 10. Also, as shown, the sensor 22 is a wand. By well known mechanisms such as springs (not shown) the sensor 22 determines the relationship of the vehicle to the path and the relationship is read by deviation or sensor encoder 30. The encoder 30 is schematically shown. The sensor 22 wand extends down and between a physical index, that is, between the stalks or stems of a row crop or between furrows of a field. The total encoder as used in this description would include a quadrature decoders to translate the information from the encoder 30 proper into numbers more readily usable by a digital computer. The quadrature decoder may in fact be located in the computer housing rather than the encoder housing.

Knowing the deviation as determined by the sensor 22 as transmitted by the encoder 30, different apparatus may cause the steerable wheels 14 changed so that the vehicle faithfully follows the desired path. One method of doing this is by a steering motor 32 which is preferable a step-motor. That is to say, upon one impulse or unit of signal from a computer to the step-motor will move a precise and definite step or rotation. In this instance, that rotation is 1.66 degrees. The step-motor 32 is geared to the steering wheel 20 by suitable mechanism 34, to thereby turn the steering wheel 20 and thus move the steerable wheels 14 for the desired purpose.

Those having skill in the art will recognize that the equipment in this Description of the Preferred Embodiment, to this point, is old and well known to the art.

It has been found advantageous to have additional information, specifically to know the position of the guide or steerable wheels 14. For this reason a guide wheel or steerable wheel or axle encoder 36 is attached to the vertical axle 16 to measure its rotation. The direction of the steerable wheels is called the direction of draft.

The axle and sensor encoders will normally have a zero position and rotation in one direction will be considered positive and the rotation in the other direction will be considered negative. The point or line dividing the negative rotation from positive rotation will be called either the dead ahead position or the zero or the zero set position. In the schematic representation of the equipment, there has not been shown the control or computer itself nor its connection to three elements to which it is connected, namely the sensor encoder, steering motor, and axle encoder. Those having ordinary skill in the art will understand how these connections can be made, power supplied to the computer and the like.

EQUATIONS

The basic operation is summarized in the following equations and notes:

1(a) $R \cdot (SE_1 + SE_2 + SE_3 + \ldots + SE_n) \div n = RSE$

1(b) $RSE - AE = M$

2(a) $R \cdot (SE_1 + SE_2 + SE_3 + \ldots + SE_{kn}) \div kn = OC$ input

2(b) $AE - OC = CAE$

2(c) $RSE - CAE = M$

3(a) $ASE100 = (SE_{n-119} + SE_{n-118} + \ldots + SE_{n-101} + SE_{n-100}) \div 20$ 3(b) $ASE0 = (SE_{n-19} + SE_{n-18} + \ldots + SE_{n-1} + SE_n) \div 20$ 3(c) $S = ASE100 - ASE0$

NOTE

For equation 1(a) n would be small such as the number of readings made in 30 ms.

For equation 2(a) n would be large such as the number of readings taken in 870 ms.

For equations 3(a) and (b) n would be very large such as the number of readings taken over 1200 ms.

Equation 1(a), 1(b), 2(c), 3(a), 3(b), and 3(c) would be run at short intervals such as every 30 ms.

Equation 2(a) and 2(b) would be run at large intervals such as 870 ms.

DETAILED OPERATIONS

The array of information comprising the adjustable sensitivity constant R, the historic sensor and encoder deviation signal SE, the average SE for slope calculations ASE, the slope value S, and any other piece of data stored in the computer represent a database of information.

BASIC

Figure 2:
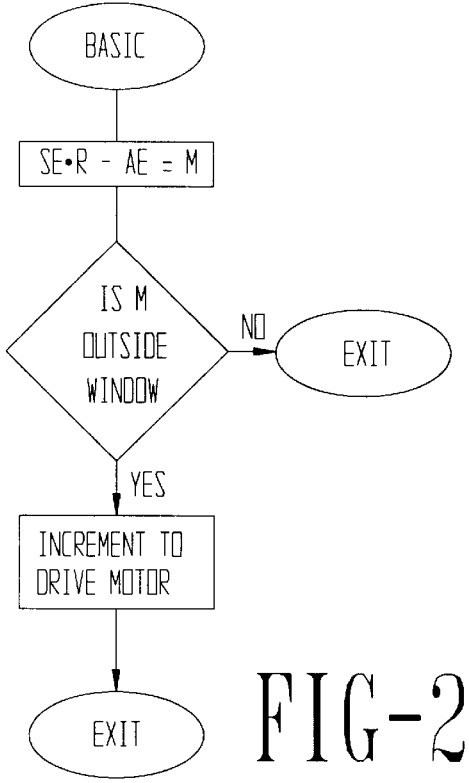
FIG. 2 is a flow chart of the simple, basic guidance system.

The basic operation without Auto-Track or Smart-Drive is shown if FIG. 2 and described now.

The sensor encoder digitized readings (SE) is transferred into the computer. The SE is multiplied by the ratio (R). The results of the multiplication is called (RSE). (Equation 1(a)). The axle encoder digitized reading (AE) is transferred into the computer and subtracted from RSE. The result of this produces a signal M to the steering motor. (Equation 1(b)). M is examined in a window. If M is between the negative limit and the positive limit, the M is in the window. With M in the window, no signal is sent to the motor. If M is outside of this window (outside the limits) then a signal is sent to the steering motor. Preferably the signal will cause the motor to run 30 ms and the magnitude of M will effect the speed of motor 32.

The limits which are compared are themselves adjustable. For example if M represents less than one-third degree, no correction would be made. Normally, one-third of a degree is the minimum reading by the encoders 30 or 36. Therefore, if the desired correction was less than a readable amount, no correction would be made.

It will be understood, as explained before, that the encoders will be reading positive and negative numbers and all of the calculations will result in both positive and negative numbers, and therefore the motor correction may be either positive or negative which is to say either clockwise or counterclockwise on the steering wheel 20 as well as the axle 16. Also, it will be understood that instead of using instantaneous readings, that the average of three readings taken at 10 ms intervals are used. By repetitive calculations and corrections, for example every 30 ms, it will be understood that the vehicle 10 may be precisely driven along a path.

It has been found desirable to use the comparison between the sensor encoder reading and the axle encoder reading and make this comparison. It has been found that with this operation and by making corrections at short intervals of time prevents the unit from hunting, that is to say overcorrecting so that the momentum of correction carries it so that the vehicle hunts from the right side of the path to the left side of the path and oscillates back and forth.

The ratio R used to multiply the sensor encoder digitized output (SE) is determined empirically. It will be understood that the degrees that the encoder axle rotates for a given deviation will depend upon the length of the wands 22, that is to say, the distance between the sensor axle 26 and the contact point on the wands. Also, to correlate how much deviation on the wands should result as a deviation on the steerable wheels will vary. This ratio will also vary with speed. It will be understood that at high speeds a very small desired change in axle position would result from the same deviation that at slow speeds would result in a greater axle adjustment. Also, many other factors will involve this.

Normally, the adjustment of the value of R is made as a operator controlled adjustment so that the operator can adjust the value of R on a control adjacent to the steering wheel.

The operations performed for the simple steering calculations are shown mathematically in equations 1(a) and 1(b) above.

ZERO SET OR AUTO-TRACK

As discussed above, if the zero set of the axle sensor digital output is incorrectly placed or if the vehicle is operating on a slope so that the normal positions of the steerable wheels is at an angle to the vehicle axis or if a curve is being negotiated; then it is desirable that the axle encoder digital output be changed so that the zero set is at the average position of the axle for a period of time.

Figure 3:
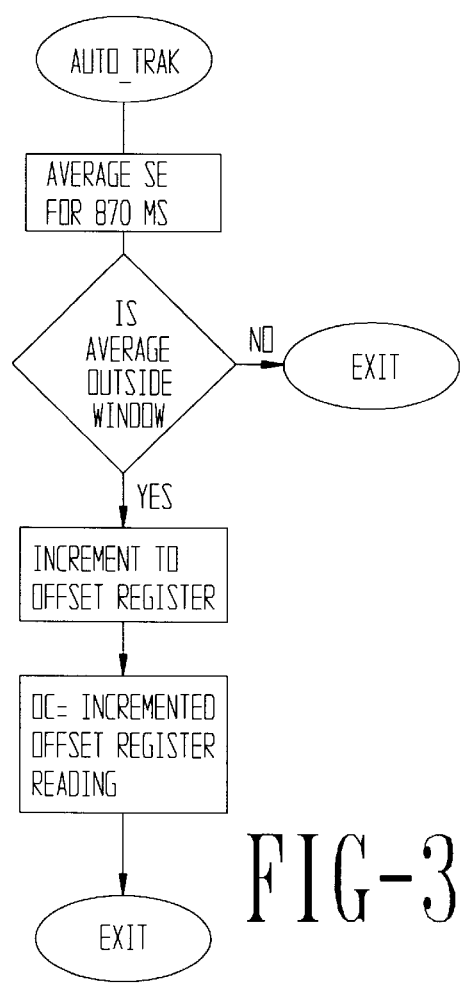
FIG. 3 is a simplified flow chart for the basic Auto_Trak, that is to say the basic adjustment to change in the event the vehicle is being biased in one direction or the other.
Figure 6:
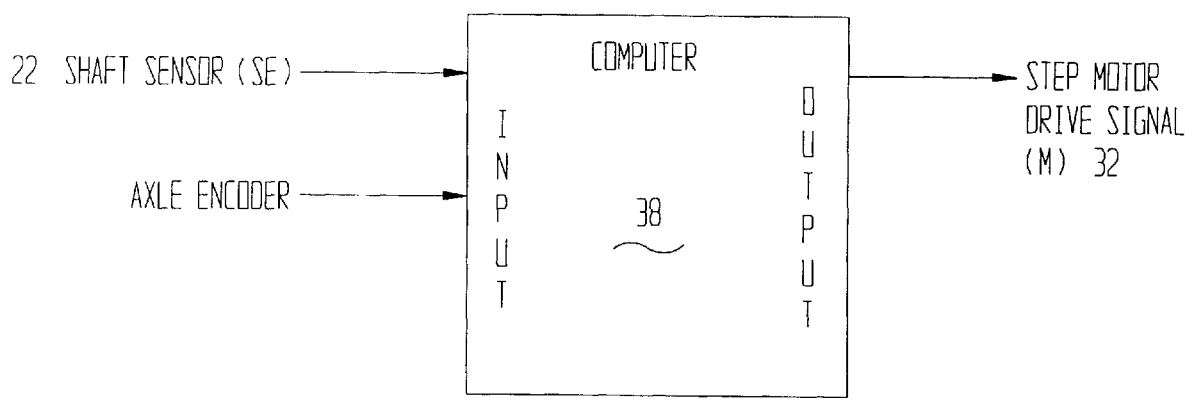
FIG. 6 is a simplified schematic diagram of the computer showing the inputs and outputs.

This zero adjustment is made in the following manner and shown by the flow chart in FIG. 3. The sensor encoder digital readings (SE) are accumulated over a period of time. The period of time is empirically determined. For most farm operations, a period of 870 ms works well. In some operations, the period of time might be as low as 0.2 seconds. In other situations and with other operations it might be desirable to make the period of time of accumulation even greater than 1 second.

Regardless of the length of time that the SE are accumulated, they are averaged. If the average is within a small window no correction is made. As before, if zero correction is less than one-third of a degree no correction would be made. On the other hand, if the correction is above the limit then a unit adjustment would be put into an offset-register. The unit to be put into the offset-register would be the smallest unit recognized by the AE.

Thereafter, in the steering operation, wherein the AE was to be used, there would be a corrected axle encoder digital reading (CAE) would be used. The difference between the AE and the offset-register (OC) will equal CAE which will be used in the calculations to obtain M.

The zero set operations are shown in equations 2(a) and 2(b) above and the steering calculations are set out in equation 2(c) set out above.

SMART-DRIVE

The Smart-Drive is used only when the vehicle is away from the path, and also is moving back toward the path. Other than this situation, the Smart-Drive is not used. Therefore, the first problem to be solved is to determine through a reading of the sensor (SE) as to the position and movement of the vehicle with respect to the path. This is done by calculating a slope.

To calculate a slope, the position of the Smart-Drive is determined on 10 ms intervals and these 10 ms interval determinations are retained for at least 1.2 seconds. As shown in the flow chart (FIG. 5), the first calculation to be made is a calculation of where the vehicle was in relation to the path one second ago. This is done by averaging the SE readings for 1.19 seconds ago to 1.0 seconds ago.

This is expressed by the equation (3(a)) in FIG. 5 ASE100 (1 second previous) is determined by adding the readings that were taken 1200 ms to 1000 ms ago, adding them together and dividing by 20.

ASE0 is calculated by equation (3(b)) as seen in FIG. 5 by adding the last twenty readings that have been taken dividing by 20. The slope (S) is found by subtracting the present or current average (ASE0) from the previous or old readings, (ASE100). (Equation (3(c)). If the deviation of the vehicle to the path is such that SE is positive, it may be seen that if the first readings were positive and the second readings were also positive and if the second readings were less than the first readings, this would indicate that the vehicle is going back toward the path. Therefore, if the most recent SE readings are positive and if the slope is positive, this means that the vehicle is moving toward the path. Likewise, if the SE readings are negative and the ASE100 readings are further away, therefore their reading is lower than the less negative readings of the recent one that the subtraction of ASE100 minus ASE0 will also report that the slope is negative.

If S and ASE0 are the same sense, YES, the vehicle is going back to the path. If (1) the sense is different or (2) either S or ASE0 are zero, NO, the vehicle is not going back to the path. With a YES answer the Smart-Drive will be engaged. When the Smart-Drive is engaged the RSE set to be zero.

Referring to the flow chart of FIG. 5, with a NO answer the correction is the same as shown in FIG. 4. The SE is averaged over 30 ms; the RSE is calculated: the corrected axle encoder (CAE) is calculated; the M is calculated and the drive motor implemented.

However, with the Smart-Drive in, the Smart-Drive will cause the RSE reading to be a zero. Therefore, when the calculation is made of M=RSE−CAE it will be understood always that the calculation then will result in the form that M is equal to minus CAE. Therefore, assuming that CAE was a +5, then a −5 kick of M would be provided. So the result is that if the Smart-Drive is inserted that the correction of the guide wheels angling the vehicle back toward the path will be reduced 30 ms. If at any time the slope goes to zero, then the zero slope is not considered to be the same sense; and the normal guiding system will be implemented. That is, if the RSE shows the vehicle to be off the path, that a correction to bring the vehicle back to the path will be implemented.

Stated otherwise, the Smart-Drive reduces the rapidity by which the vehicle is brought back to the path once it strays from the path.

The embodiment shown and described above is only exemplary. We do not claim to have invented all parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. A method of guiding a land vehicle along a predetermined meandering path, said path having established physical boundaries, and said vehicle having a steerable axle; said method of guiding including the steps of:

a) aligning the vehicle with respect to a portion of said predetermined path;

b) periodically determining the lateral position of said vehicle with respect to said path;

c) periodically determining the position of said steerable axle and thereby ascertaining a direction of draft with respect to a predetermined physical reference azimuth;

d) periodically adjusting the steering axle responsive to steps b) and c); and e) periodically adjusting said steerable axle according to said steering corrections;

wherein the method includes the steps of:

f) periodically determining an axle correction factor based on the deviation between the direction of draft of the vehicle and the intended path over a predetermined interval of time;

g) using said axle correction factor to determine a corrected position of said steerable axle;

h) mathematically determining an offset steering correction with reference to said corrected axle position; and i) applying said offset steering correction to said steerable axle.

2. An improved method of operating an automatic guidance system with the aid of a digital computer, for use in a land vehicle, at least two ground engaging wheels, at least one of said wheels attached to a steerable axle, said axle attached to the vehicle by a pivot, a steering means connected to the pivot, a sensing means attached to the steerable axle, a path sensing means attached to the vehicle, and an actuating means attached to the steering means, said method including:

a) providing a computer with a data base for said vehicle, including at least a constant representing the amount of physical input which must be applied to the steering means in order to effect a desired positional change in the steerable axle, and an adjustable sensitivity constant (R);

b) predetermining a path for said vehicle, said path being established with reference to a physical index;

c) imparting motion to the vehicle in a direction of draft;

d) placing the path sensing means in close proximity to the physical index;

e) repetitively performing a steering correction process, said process including the steps of:

1) initiating a first interval timer, and during said interval repetitively determining the deviation (SE) of the preestablished path from a predetermined reference azimuth using said path sensing means;

2) constantly providing the computer with said deviation (SE);

3) accumulating a set of said deviations ($SE_1, \ldots, SE_n$) in a buffer;

4) upon the expiration of said interval, calculating in the computer a time averaged deviation ($SE_{av}$) between the reference azimuth and the predetermined path;

5) multiplying the time averaged deviation value ($SE_{av}$) by a sensitivity constant (R) to obtain a ratio adjusted deviation average (RSE)

6) determining the position of said axle (AE) according to a predetermined axle reference azimuth;

7) providing said axle position (AE) to the computer;

8) calculating a steering correction (M) to correlate the position of said axle necessary to move the vehicle along the preestablished path, by subtracting the axle position (AE) from the ratio adjusted deviation average (RSE);

9) applying a filter to said steering correction to ensure that it exceeds a minimum threshold value; and 10) transmitting said steering correction (M) to said actuating means;

wherein the improved method includes the steps of:

f) computing an axle zero correction factor ($C_0$) by:

1) periodically initiating a second interval timer for a time substantially larger than the interval of said first interval timer;

2) accumulating a set of deviation values ($SE_1, \ldots, SE_{kn}$) in a correction factor buffer during said second interval;

3) calculating the product ($C_0$) of a time averaged value of said deviation values accumulated during said second interval ($SE_{kav}$) and a variable sensitivity constant (R);

4) storing the value of said product ($C_0$) in a zero correction register;

g) calculating the difference between the axle position value (AE) and the value of said zero correction register ($C_0$), and storing the value of said difference as a corrected axle reference azimuth value (CAE); and h) calculating the steering correction (M) needed to adjust the direction of draft of the vehicle to correspond to its intended path by calculating the difference between the current ratio adjusted deviation average (RSE) and the corrected axle reference azimuth value (CAE)

j) transmitting said steering correction to said actuating means.

3. The method as defined in claim 2 wherein said land vehicle is an agricultural tractor.

4. The method as defined in claim 3 wherein said path is a crop row.

5. An improved method of guiding a land vehicle along a predetermined meandering path, said vehicle having a steerable axle, said path having established physical boundaries, and said path having non-periodic oscillations deviating from a hypothetical linear path, said method comprising:

a) aligning the vehicle with respect to a portion of said predetermined path;

b) periodically determining the position of said vehicle with respect to said path;

c) determining the position of said steerable axle and thereby ascertaining the direction of draft with respect to a predetermined physical reference azimuth;

d) mathematically determining a steering correction to be applied to said steerable axle to correct the direction of draft to correlate with said predetermined path; and e) adjusting said steerable axle according to said steering corrections;

wherein the improved method includes the steps of:

f) calculating a slope of previous positions of the vehicle with respect to the desired path as a function of time;

g) comprising said slope to the current position of said vehicle with respect to the desired path;

h) mathematically determining whether said vehicle is moving along said desired path toward or away from said predetermined path; and i) upon concluding that the vehicle is moving toward the predetermined path and has previously moved away from the predetermined path, automatically applying a steering factor to move the vehicle away from the predetermined path.

6. An improved method of operating an automatic guidance system for use in a land vehicle with the aid of a digital computer, at least two ground engaging wheels, at least one of said wheels attached to a steerable axle, said axle attached to the vehicle by a pivot, an automatic steering means connected to the pivot, an axle position sensing means attached to the steerable axle, a path sensing means attached to the frame, and a mechanical actuating means attached to the steering means, said method including:

a) providing said computer with a data base for said vehicle, including at least a constant representing the amount of physical input which must be applied to the steering means in order to effect a desired change in the steerable axle, b) preestablishing a path for said vehicle, said path having established physical boundaries, and said path having non-periodic oscillations deviating from a hypothetical linear path, and said path being defined with reference to a physical index;

c) imparting motion to the vehicle in a direction of draft;

d) placing the path sensing means in close proximity to the physical index;

e) initiating a steering correction process, said process including the steps of:

1) initiating a first interval timer, and during said interval repetitively determining the deviation (SE) of the preestablished path from a predetermined reference azimuth using said path sensing means;
2) constantly providing the computer with said deviation (SE);
3) accumulating a set of said deviations ($SE_1, \ldots, SE_n$) in a buffer;
4) upon the expiration of said interval, calculating in the computer a time averaged deviation ($SE_{av}$) between the reference azimuth and the predetermined path;
5) multiplying the time averaged deviation value ($SE_{av}$) by a sensitivity constant (R) to obtain a ratio adjusted deviation average (RSE)
6) determining the position of said axle (AE) according to a predetermined axle reference azimuth;
7) providing said axle position (AE) to the computer;
8) calculating a steering correction (M) to correlate the position of said axle necessary to move the vehicle along the preestablished path, by subtracting the axle position (AE) from the ratio adjusted deviation average (RSE);
9) applying a filter to said steering correction to ensure that it exceeds a minimum threshold value; and
10) transmitting said steering correction (M) to said actuating means;

wherein the improved method includes the steps of:
f) accumulating a designated number of previous deviations ($SE_{n-119}, SE_{n-118}, \ldots, SE_{n-100}$) representing a preset past interval of time in a buffer;
g) calculating a slope (S) of said deviation readings with respect to time as the difference between the time averaged value of the previous deviation readings (ASE100) and the time averaged value of the set of current deviations (ASE0);
h) comparing the sense of the slope (S) to the sense of the current time averaged deviation of the vehicle; and
j) upon determining that the current deviation are of the same sense, concluding that the vehicle has moved away from a hypothetical linear path and begun moving back towards said hypothetical linear path; thereupon
k) engaging an automatic path correction process, including the steps of:
1) substituting a zero value for the time averaged deviation value (RSE);
2) calculating a steering factor (M) necessary to steer the vehicle back to its intended path; and
3) transmitting the steering correction (M) to said steering actuating means.

7. The method as defined in claim 6 wherein said land vehicle is an agricultural tractor.

8. The method as defined in claim 7 wherein said predetermined physical path is an agricultural crop row.

9. The method defined in claim 6 and further comprising:
l) computing an axle zero correction factor ($C_0$) by:
1) periodically initiating a second interval timer for a time substantially larger than the interval of said first interval timer;
2) accumulating a set of deviation values ($SE_1, \ldots, SE_{kn}$) in a correction factor buffer during said second interval;
3) calculating the product ($C_0$) of a time averaged value of said deviation values accumulated during said second interval ($SE_{kav}$) and a variable sensitivity constant (R);
4) storing the value of said product ($C_0$) in a zero correction register;
m) calculating the difference between the axle position value (AE) and the value of said zero correction register ($C_0$), and storing the value of said difference as a corrected axle reference azimuth value (CAE); and
n) calculating the steering correction (M) needed to adjust the direction of draft of the vehicle to correspond to its intended path by calculating the difference between the current ratio adjusted deviation average (RSE) and the corrected axle reference azimuth value (CAE)
o) transmitting said steering correction to said actuating means.

10. The method as defined in claim 5 further comprising:
j) periodically determining an axle correction factor based on the deviation between the direction of the draft of the vehicle and the intended path over a predetermined interval of time;
k) using said axle correction factor to determine a corrected position of said steerable axle;
l) mathematically determining an offset steering correction with reference to said corrected axle position; and
m) applying said offset steering correction to said steerable axle.

11. A computer program product comprising: a computer useable medium having computer readable program code means embodied in said medium for causing a land vehicle to be automatically guided along a predetermined path, said path having physical boundaries and said path being determined with reference to a physical index; said vehicle having at least two ground engaging wheels, at least one of said wheels attached to a steerable axle, a sensor on said axle, a steering means on said axle, an actuating means on said steering means, and a path sensing means on said vehicle, said computer program product having:
a) computer readable program code means for causing a computer to calculate a slope for previous positions of the vehicle with respect to the desired path as a function of time;
b) computer readable program code means for causing a computer to compare said slope to the current position of said vehicle with respect to the desired path;
c) computer readable program code means for causing a computer to mathematically determine whether said vehicle is moving along said path toward or away from said predetermined path; and
d) computer readable program code means for causing a computer to automatically apply a steering factor to move the vehicle away from the predetermined path, after concluding that the vehicle is moving toward the predetermined path and has previously moved away from the predetermined path;
e) computer readable program code means for receiving a value from said axle sensing means corresponding to the position of said steerable axle with respect to a reference azimuth;
f) computer readable program code means for calculating an axle position correction factor based on said time average of deviation over said long interval of time; and
g) computer readable program code means for calculating a steering correction based on said axle correction factor, said axle position, and said predetermined path.

12. A computer product comprising: a computer useable medium having computer readable program code means embodied in said medium for causing a land vehicle to be automatically guided along a predetermined path, said path having physical boundaries and said path being determined with reference to a physical index; said vehicle having at least two ground engaging wheels, at least one of said wheels attached to steerable axle, a sensor on said axle, a steering means on said axle, an actuating means on said steering means, and a path sensing means on said vehicle, said computer program having:

a) computer readable program code means for causing a computer to calculate a slope for previous positions of the vehicle with respect to the desired path as a function of time;

b) computer readable program code means for causing a computer to compare said slope to the current position of said vehicle with respect to the desired path;

c) computer readable program code means for causing a computer to mathematically determine whether said vehicle is moving along said path toward or away from said predetermined path; and d) computer readable program code means for causing a computer to automatically apply a steering factor to move the vehicle away from the predetermined path, after concluding that the vehicle is moving toward the predetermined path and has previously moved away from the predetermined path.

13. The computer program as defined in claim 12 further comprising:

e) computer readable program code means for causing a computer to store a plurality of values representing the deviation of said predetermined path from a predetermined reference azimuth on the vehicle;

f) computer readable program code means for causing a computer to store a small array of said deviation values over a short first interval of time;

g) computer readable program code means for causing a computer to store a large array of said values over a longer interval of time;

h) computer readable program code means for calculating a timed average of said deviation values over said long interval of time and said short interval of time;

i) computer readable program code means for receiving a value from said axle sensing means corresponding to the position of said steerable axle with respect to a reference azimuth;

j) computer readable program code means for calculating an axle position correction factor based on said time average of deviation over said long interval of time; and k) computer readable program code means for calculating a steering correction based on said axle correction factor, said axle position, and said predetermined path.

\* \* \* \* \*